United States Patent [19]

Geoffroy

[11] Patent Number: 4,503,669

[45] Date of Patent: Mar. 12, 1985

[54] GAS TURBINE THRUST SYSTEM

[76] Inventor: Henri Geoffroy, 5235, rue des Arbres, Pierrefonds, Quebec, Canada, H8Z 2M1

[21] Appl. No.: 469,999

[22] Filed: Feb. 25, 1983

[51] Int. Cl.³ .............................................. F02C 3/00
[52] U.S. Cl. .................................... 60/39.75; 415/56; 415/59
[58] Field of Search .............. 60/39.34, 39.35, 39.43, 60/39.75, 735; 415/52, 55, 56, 57, 58, 59, 83, 84

[56] References Cited

U.S. PATENT DOCUMENTS

| | | | |
|---|---|---|---|
| 893,127 | 7/1908 | Barber | 415/58 |
| 1,022,683 | 4/1912 | Kienast | 415/58 |
| 1,254,465 | 1/1918 | Bentley | 415/52 |
| 1,331,999 | 2/1920 | Newcomb | 415/52 |
| 2,524,549 | 10/1950 | Theimer | 60/39.43 X |
| 3,027,716 | 4/1962 | Parker | 60/39.35 |
| 3,709,629 | 1/1973 | Traut | 415/56 |
| 4,070,824 | 1/1978 | Traut | 60/39.43 |

Primary Examiner—Louis J. Casaregola
Assistant Examiner—Donald E. Stout
Attorney, Agent, or Firm—Schwartz, Jeffery, Schwaab, Mack, Blumenthal & Koch

[57] ABSTRACT

The present invention relates to turbine motors which make use of combustion gas to turn a turbine wheel. The motors make use of a reaction tunnel consisting of a casing having a central chamber with a turbine wheel rotatably mounted therein. The central chamber is provided with openings along two opposing side walls such that combustion gas may circulate in a corkscrew-like fashion through the reaction tunnel via exterior gas conduits which link holes on the opposing side walls of the chamber. Incoming air is preheated by being brought into contact with the exterior gas conduits so that the air may undergo indirect heat exchange with combustion gas, the preheated air then being fed to the air inlet of a combustion chamber. The motors of the present invention thus make use of heat which would otherwise be lost.

30 Claims, 7 Drawing Figures

GAS TURBINE THRUST SYSTEM

The present invention relates to gas turbine motors and more particularly to turbine motors which can be made on a relatively compact scale and in which heat from hot combustion gas may be transfered to compressed air prior to combustion.

Gas turbine motors operate on a continuous cycle which generally includes compression, combustion, reaction and evacuation. Thus air is compressed by compressor means and is fed to combustion means along with a suitable fuel. Combustion gas produced by the combustion means is caused to react against the reaction blades of a rotor. The impact of the hot rushing gas on the blades causes the rotor to turn at high speed, torque being transferred therefrom by some means to a power shaft from which useful work can be extracted.

It would be advantageous to be able to recuperate heat from the combustion gas to preheat compressed air being delivered to the combustion means; the fuel efficiency of a turbine motor would be thus enhanced.

It would also be advantageous to have a turbine motor which could be made on a relatively small scale, i.e. compact.

In general, the present invention provides a thrust system, suitable for a gas turbine motor, comprising a reaction ring tunnel having a first ring tunnel wall member and a second ring tunnel wall member, said first ring tunnel wall member being provided with first and second spaced apart opposing walls, said second ring tunnel wall member being defined by the periphery of a rotor ring, said rotor ring being in sealing and rotational engagement with said first ring tunnel wall member, radial reaction blades fixed to said rotor ring and disposed in said reaction ring tunnel between said first and second opposing walls, said reaction blades being spaced apart from each other by a gap and being distributed around the periphery of said rotor ring, each of said reaction blades being spaced apart from said first ring tunnel wall member to provide a small clearance therebetween, each of said reaction blades having a leading edge and a following edge, said leading edge being adjacent to said first opposing wall, said following edge being adjacent to said second opposing wall, at least one reaction chamber comprising two end tunnel segments spaced apart by a plurality of abutting zones, each end tunnel segment comprising respective length portions of said first and second ring tunnel wall members and having a length whereby at least one reaction blade is always completely disposed therein, each zone comprising respective length portions of said first and second ring tunnel wall members, the portion of the first opposing wall of each zone being provided with a first gas aperture, the portion of the second opposing wall of each zone being provided with a second gas aperture, said zones commencing with a first zone and terminating with an exhaust zone, the second gas aperture of said exhaust zone being in gas communication with an exhaust conduit, the second gas aperture of each of the other zones being in gas communication with the first gas aperture of the following abutting zone by means of a respective exterior gas heat exchange conduit, combustion means, in which fuel can be combusted, having a fuel inlet, a compressed air inlet and igniter means, the first gas aperture of the first zone of said reaction chamber being in gas communication with said combustion means, said combustion means, said reaction chamber and said reaction blades being adapted to cooperate so that combustion gas is supplied to said reaction chamber and reacts upon the reaction blades to impart thrust to said rotor ring, said exterior gas conduits being adapted to allow indirect heat exchange between combustion gas and compressed air, before the air is delivered to the compressor air inlet.

The present invention, more particularly, provides a gas turbine motor comprising:

at least one reaction ring tunnel having a first ring tunnel wall member and a second ring tunnel wall member, said first ring tunnel wall member being provided with first and second spaced apart opposing walls, said second ring tunnel wall member being defined by the periphery of a rotor ring, said rotor ring being in sealing and rotational engagement with said first ring tunnel wall member, a power shaft axially disposed with respect to said reaction ring tunnel, fixing means fixing said rotor ring to said power shaft, rotational engagement means fixed to said first ring tunnel wall member and rotationally engaging said power shaft, radial reaction blades fixed to said rotor ring and disposed in said reaction ring tunnel between said first and second opposing walls, said reaction blades being spaced apart from each other by a gap and being distributed around the periphery of said rotor ring, each of said reaction blades being spaced apart from said first ring tunnel wall member to provide a small clearance therebetween, each of said reaction blades having a leading edge and a following edge, said leading edge being adjacent to said first opposing wall, said following edge being adjacent to said second opposing wall, at least one reaction chamber comprising two end tunnel segments spaced apart by a plurality of abutting zones, each end tunnel segment comprising respective length portions of said first and second ring tunnel wall members and having a length whereby at least one reaction blade is always completely disposed therein, each zone comprising respective length portions of said first and second ring tunnel wall members, the portion of the first opposing wall of each zone being provided with a first gas aperture, the portion of the second opposing wall of each zone being provided with a second gas aperture, said zones commencing with a first zone and terminating with an exhaust zone, the second gas aperture of said exhaust zone being in gas communication with an exhaust conduit, the second gas aperture of each of the other zones being in gas communication with the first gas aperture of the following abutting zone by means of a respective exterior gas heat exchange conduit, combustion means, in which fuel can be combusted, having a fuel inlet, a compressed air inlet and igniter means, the first gas aperture of the first zone of said reaction chamber being in gas communication with said combustion means, said combustion means, said reaction chamber and said reaction blades being adapted to cooperate so that combustion gas is supplied to said reaction chamber and reacts upon the reaction blades to impart thrust to said rotor ring, a compressed air housing fixed to said first ring tunnel wall member and having an air inlet and air compression means comprising at least one set of radially extending air compression blades fixed to a shaft adapted to rotate as said power shaft rotates, said air compression means being adapted to cooperate with a portion of said compressed air housing to compress air entering the air inlet of said housing, said housing being configured to bring compressed air into contact with said exterior gas conduits and then to direct said compressed air to the air inlet of said combustion means, said exterior gas conduits being adapted to allow indirect heat exchange between combustion gas and compressed air.

In accordance with the present invention each zone may be provided with first and second opposing gas pockets, the first gas aperture of each zone defining the mouth of the first gas pocket, the second gas aperture of each zone defining the mouth of the second gas pocket, the second gas pocket of the exhaust zone being in gas communication with said exhaust conduit, the second gas pocket of each of the other zones being in gas communication with the first gas pocket of the following abutting zone by means of a said respective exterior gas conduit, the first gas pocket of said first zone being in gas communication with said combustion means.

In accordance with the present invention the first ring tunnel wall member and the exterior gas conduits may be disposed within the compressed air housing and define a portion of the wall of the housing. The combustion means may also be disposed within the compressed air housing. In this way compressed air may also be brought into heat exchange contact with these elements of the motor.

The combustion means may take any suitable form. For example, it may take the form of a distinct combustion chamber provided with fuel and air inlets and with suitable igniter means for continuous combustion. Alternatively, the reaction chamber itself may be configured to define the combustion means which will contribute to the compactness of the motor. Thus the reaction chamber may include a second zone disposed prior to the exhaust zone and following and abutting the first zone. The combustion means can then be defined by the first gas pockets of the first and second zones, the first gas pocket of the first zone being provided with said fuel inlet and said air inlet, the first gas pocket of said second zone being provided with said igniter means.

In accordance with the present invention the reaction blades may be identical and may be disposed in parallel arrangement such that the gaps between all of them are also identical. The apertures of each zone may be dimensioned so that they are equal to or smaller than these gaps.

A gas turbine in accordance with the present invention may comprise a single reaction ring tunnel with two or more identical reaction chambers disposed about said tunnel. The zones of the identical reaction chambers are the same in number and in configuration. The end tunnel segments of identical reaction chambers are of the same length; an end tunnel segment may be shared by two adjacent reaction chambers.

In accordance with the present invention the shaft of the air compression means can comprise a portion of the power shaft i.e. to give a relatively compact motor.

Thus the present invention also provides a gas turbine motor comprising:

at least one reaction ring tunnel having a first ring tunnel wall member and a second ring tunnel wall member, said first ring tunnel wall member being provided with first and second spaced apart opposing walls, said second ring tunnel wall member being defined by the periphery of a rotor ring; said rotor ring being in sealing and rotational engagement with said first ring tunnel wall member, a power shaft axially disposed with respect to said reaction ring tunnel, fixing means fixing said rotor ring to said power shaft, two spaced apart cover plates sealingly fixed to said first ring tunnel wall member, the fixing means fixing said rotor ring to said power shaft being disposed between said cover plates, said power shaft being in sealing and rotational engagement with said cover plates, said cover plates and said first ring tunnel wall member defining a shroud for said rotor ring and the means fixing said rotor ring to said power shaft, radial reaction blades fixed to said rotor ring and disposed in said reaction ring tunnel between said first and second opposing walls, said reaction blades being spaced apart from each other by a gap and being distributed around the periphery of said rotor ring, each of said reaction blades being spaced apart from said first ring tunnel wall member to provide a small clearance therebetween, each of said reaction blades having a leading edge and a following edge, said leading edge being adjacent to said first opposing wall, said following edge being adjacent to said second opposing wall, at least one reaction chamber comprising two end tunnel segments spaced apart by a plurality of abutting zones, each end tunnel segment comprising respective length portions of said first and second ring tunnel wall members, and having a length whereby at least one reaction blade is always completely disposed therein, each zone comprising respective length portions of said first and second ring tunnel wall members, the portion of the first opposing wall of each zone being provided with a first gas aperture, the portion of the second opposing wall of each zone being provided with a second gas aperture, said zones commencing with a first zone and terminating with an exhaust zone, the second gas aperture of said exhaust zone being in gas communication with an exhaust conduit, the second gas aperture of each of the other zones being in gas communication with the first gas aperture of the following abutting zone by means of a respective exterior gas heat exchange conduit, combustion means, in which fuel can be combusted, having a fuel inlet, a compressed air inlet and igniter means, the first gas aperture of the first zone of said reaction chamber being in gas communication with said combustion means, said combustion means, said reaction chamber and said reaction blades being adapted to cooperate so that combustion gas is supplied to said reaction chamber and reacts upon the reaction blades to impart thrust to said rotor ring, a compressed air housing fixed to said first ring tunnel wall member and having an air inlet, said first ring tunnel wall member and said exterior gas conduits being disposed within said compressed air housing and defining a portion of the wall of said housing, and air compression means comprising at least one set of radially extending air compression blades fixed to a portion of said power shaft extending outside of said shroud, said air compression means being disposed adjacent to said shroud and being adapted to cooperate with a portion of said compressed air housing to compress air entering the air inlet of said housing, said housing being configured to bring compressed air into contact with said exterior gas conduits and then to direct said compressed air to the air inlet of said combustion means, said exterior gas conduits being adapted to allow indirect heat exchange between combustion gas and compressed air.

In accordance with the present invention a portion of the shroud referred to above adjacent to the air compression means may define a portion of the wall of the compressed air housing. Heat transfer may also occur across the shroud between lubrication fluid within the shroud and compressed air in the air housing.

The means for sealingly engaging the various elements of the turbine motor of the present invention can take any suitable form. They may for example be gaskets formed from teflon or other heat resistant material.

The means for rotationally engaging various elements of the turbine motor of the present invention may also take any suitable form. They may possibly take the form of bearings i.e. ball bearings; they may also take the form of a floating bearing wherein the two elements rotating with respect to each other are separated by a suitable fluid film or layer (e.g. layer of a suitable liquid lubricant).

A gas turbine motor in accordance with the present invention may consist of two or more reaction ring tunnels disposed side by side, the rotor ring of each being separately fixed to the power shaft.

The exterior gas heat exchange conduits may take any configuration; they can be spaced apart from each or they may abut each other and the zones. The conduits are however constructed so as to allow (e.g. facilitate) an exchange of heat between combustion gas and compressed air.

The first and second gas apertures may occupy a substantial portion of the length of a first and second opposing wall, respectively. They may also be smaller than the length of the zone and even the distance between blades (i.e. dimensions smaller than the gaps).

In accordance with the present invention combustion gas can circulate through the zones and the exterior gas conduits in the manner of a gas cork screw or endless gear to not only faciliate heat exchange with compressed air but to also facilitate rotation of the rotor ring and as a consequence the power shaft.

The various construction parameters, for example materials of construction, the number of blades, the form of the blades, the gap between adjacent blades, the form and number of reaction chambers, the form and number of zones for a reaction chamber, the form of the gas pockets etc, are of course chosen in a manner which is consistent with obtaining useful power from the rotor while recuperating heat from the combustion gas.

Figure 1:
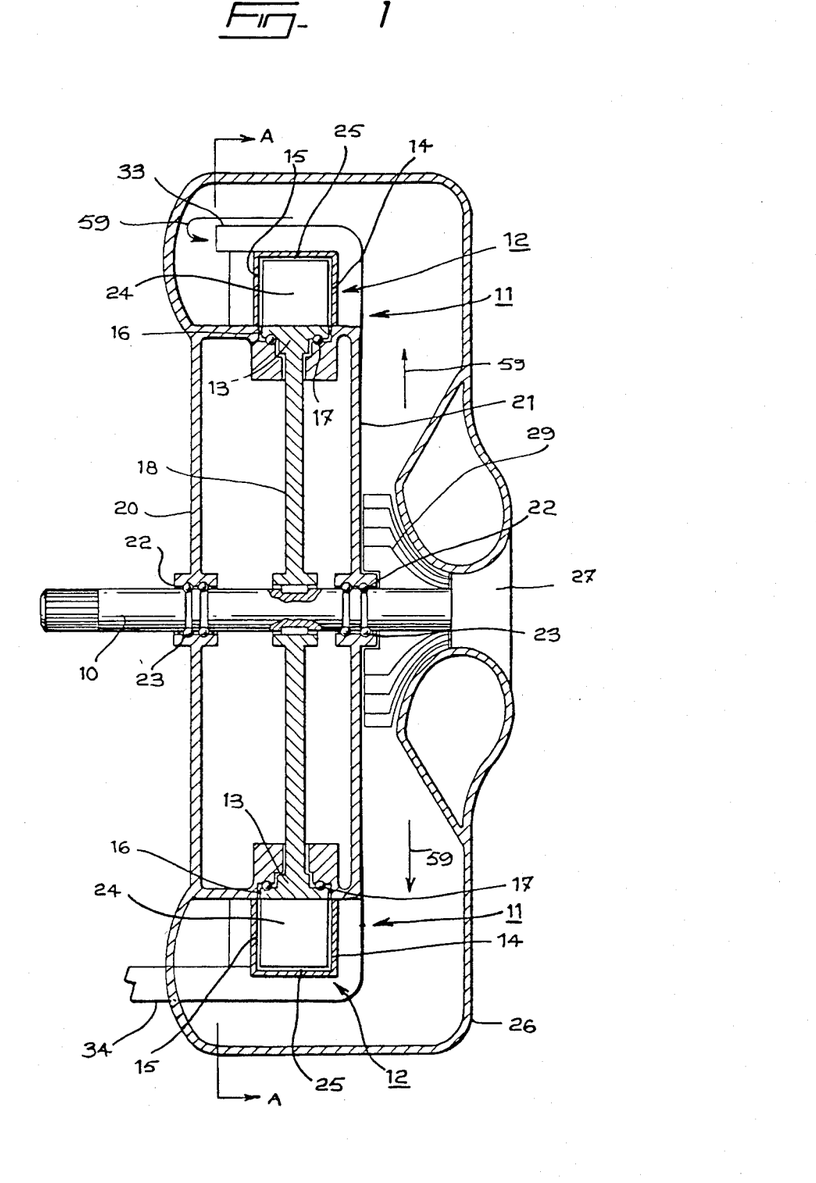
FIG. 1 is a cross-sectional view of an embodiment of a turbine motor in accordance with the present invention.
Figure 2:
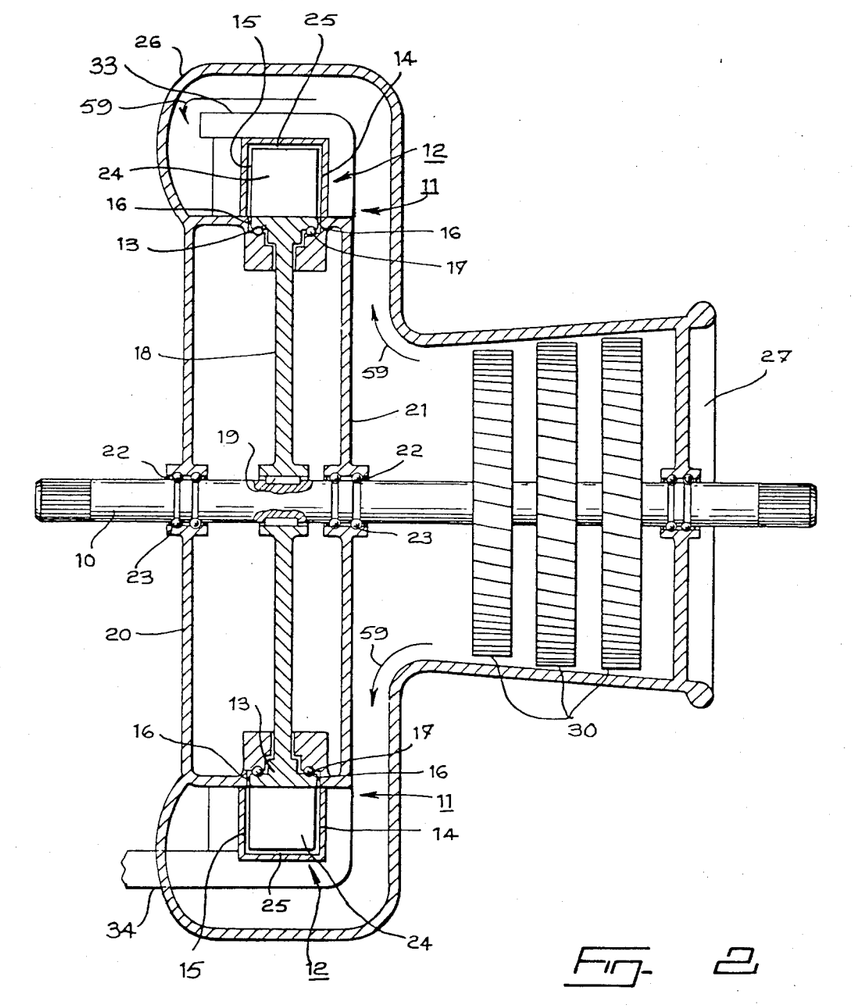
FIG. 2 is a cross-sectional view of an embodiment of a turbine motor in accordance with the present invention, having a different air compression means than illustrated in FIG. 1.

In drawings which illustrate embodiments of the invention,

FIGS. 1 and 2 illustrate two embodiments of the present invention which differ only with respect to the air compression means; in the following discussion the same reference numerals are used to refer to the common elements thereof.

Figure 3:
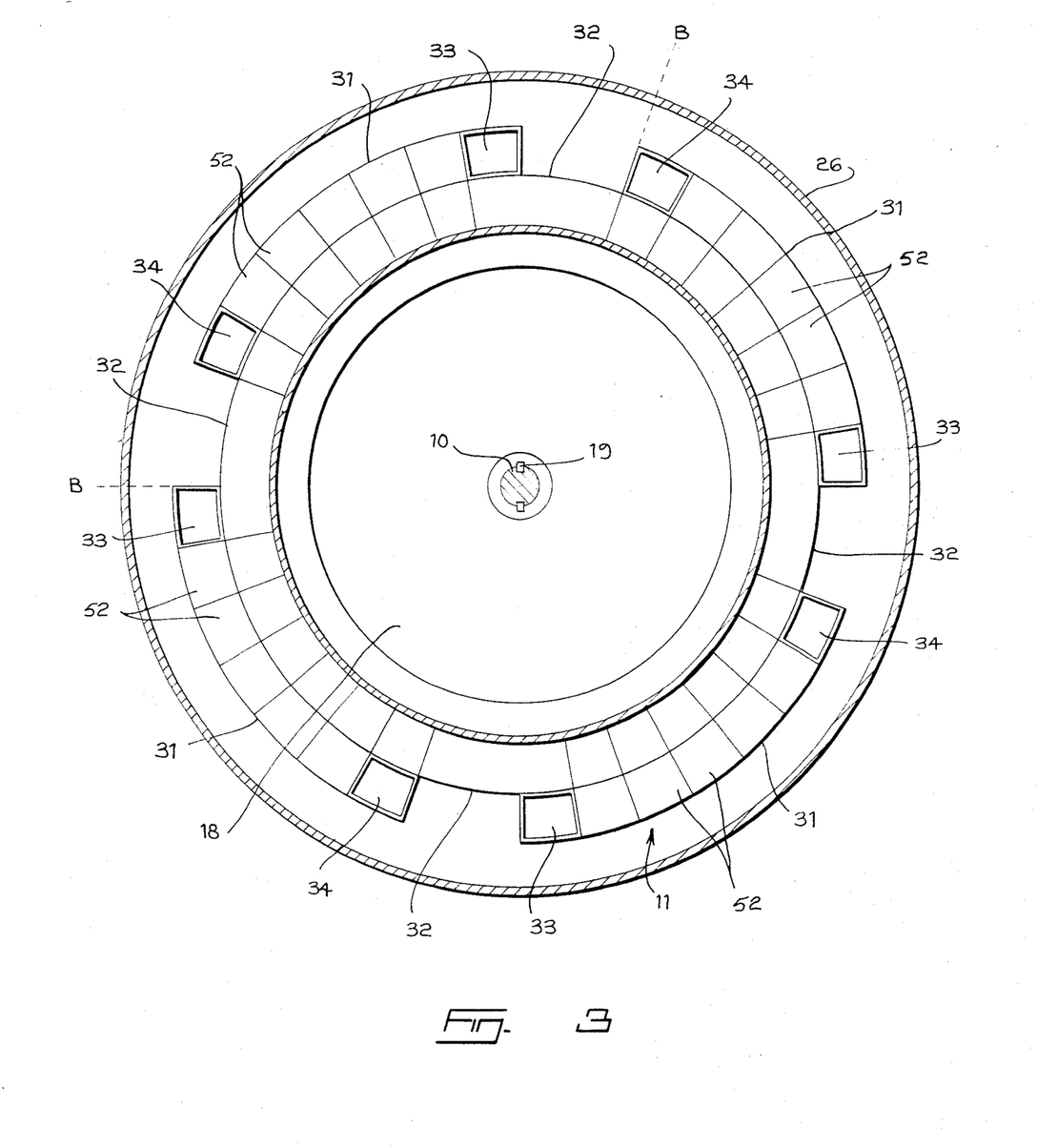
FIG. 3 is an axial view of a section along A—A of the turbine motor illustrated in FIG. 1.

As can be seen in FIGS. 1, 2 and 3, the two embodiments are provided with a power shaft 10 which is disposed axially with respect to the reaction ring tunnel illustrated generally at 11.

Turning to FIGS. 1 and 2, the reaction ring tunnel 11 has a first ring tunnel wall member generally indicated at 12 and a second ring tunnel wall member defined by the periphery of a rotor ring 13. The first ring tunnel wall member has first 14 and second 15 spaced apart opposing walls. The rotor ring 13 is in sealing engagement with the first ring tunnel wall member 12 by means of suitable sealing means 16 which may take the form of a gasket made for example from teflon. The rotor ring 13 is in rotational engagement with the first ring tunnel wall member 12 by means of bearings (e.g. ball bearings) some of which are illustrated at 17; the bearings are distributed around the ring tunnel 11 between the first ring tunnel wall member 12 and the rotor ring 13.

The means for fixing the rotor ring 13 to the power shaft 10 consists of a circular linking plate 18 which extends radially from the power shaft. The circular linking plate 18 as illustrated is fixed to the power shaft by a suitable pin or key 19 and is integral with the rotor ring 13. Alternatively the fixing means for fixing the rotor ring 13 to the power shaft may take the form of spokes of a wheel with the power shaft at the hub.

The first ring tunnel wall member 12 is sealingly fixed to two spaced apart cover plates 20 and 21. The circular linking plate 18 is disposed between these cover plates 20 and 21. The power shaft 10 is in sealing engagement with the cover plates 20 and 21 by suitable sealing means 22 which may take the form of a teflon gasket. The power shaft is also in rotational engagement with the cover plates 20 and 21 by means of bearings 23. The cover plates 20 and 21 and the first ring tunnel wall member 12 define a shroud for the rotor ring 13 and the circular linking plate 18. The shroud may contain a liquid lubricant for facilitating the rotation of the rotor ring 13 and the power shaft 10 with respect to the shroud.

Radial reaction blades 24 are fixed to the periphery of the rotor ring 13 and are disposed between the first 14 and second 15 opposing walls. The blades 24 are spaced apart from the first ring tunnel wall member 12 to provide a small clearance 25 therebetween. The blades 24 occupy a substantial portion of the tunnel defined by the reaction ring tunnel 11.

A compressed air housing 26 is sealingly fixed to the first ring tunnel wall member 12 and includes air inlet 27.

Exhaust conduits 34 are also provided for the evacuation of combustion gas.

Turning to FIG. 1, the air compression means comprises a single set of radially extending air compression blades 29 fixed to the power shaft 10 adjacent to the cover plate 21. The blades 29 are adapted to cooperate with a portion of the housing 26 so that as the power shaft 10 rotates, air from the inlet 27 is compressed. The housing 26 is configured to direct the compressed air 59 to the air inlet 33 of the combustion means which will be described further on.

The compression means illustrated in FIG. 2 is also disposed adjacent to cover plate 21 and is also fixed to a portion of the power shaft 10 which extends outside of the shroud. The compression means comprises three sets of neighbouring radially extending air compression blades 30. Again a portion of the compressed air housing 26 is adapted to cooperate with the compression means so that as the power shaft is rotated air entering the air inlet 27 is compressed. The compressed air is then directed to the inlet of the combustion means.

Figure 4:
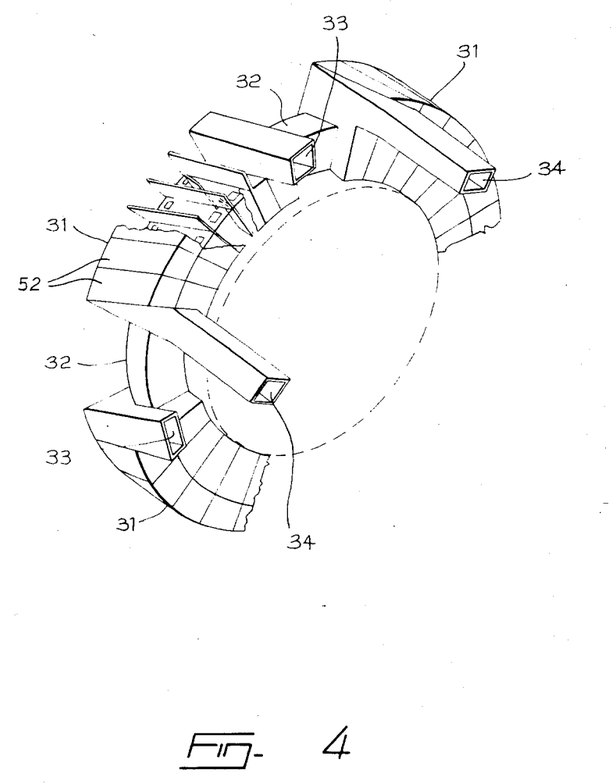
FIG. 4 is a perspective view of the reaction ring tunnel illustrated in FIG. 3.

As can be seen from FIG. 3, four identical reaction chambers 31 are disposed about the reaction tunnel 11. The zones of each of the reaction chambers are spaced apart by common end tunnel segments 32. The reaction chambers are shown in a partial perspective view in FIG. 4 Each of the reaction chambers 31 is in gas communication with an air inlet conduit 33 and an exhaust conduit 34. The exhaust conduits can individually evacuate combustion gas to the atmosphere or they may be in gas communication with a common conduit (i.e. manifold) which does so.

Figure 5:
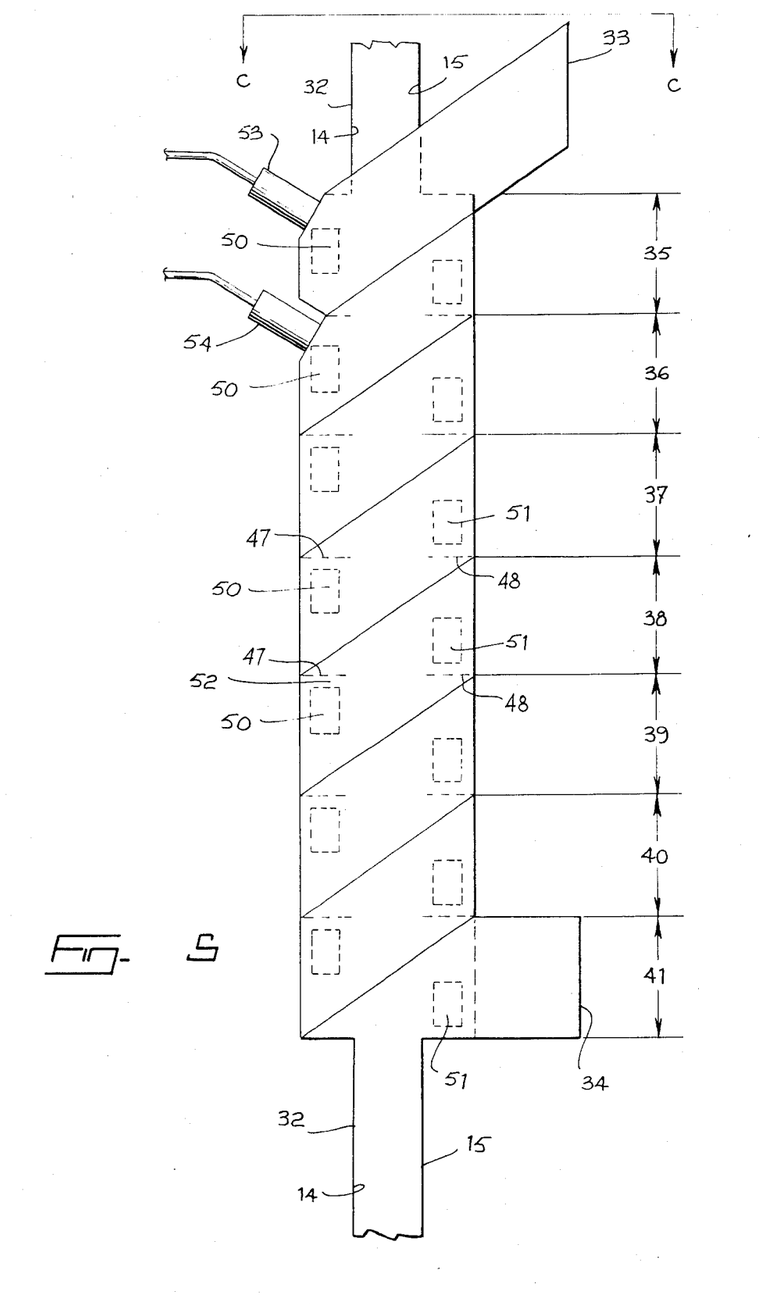
FIG. 5 is a top view of a section along B—B of a reaction chamber illustrated in FIG. 3.
Figure 6:
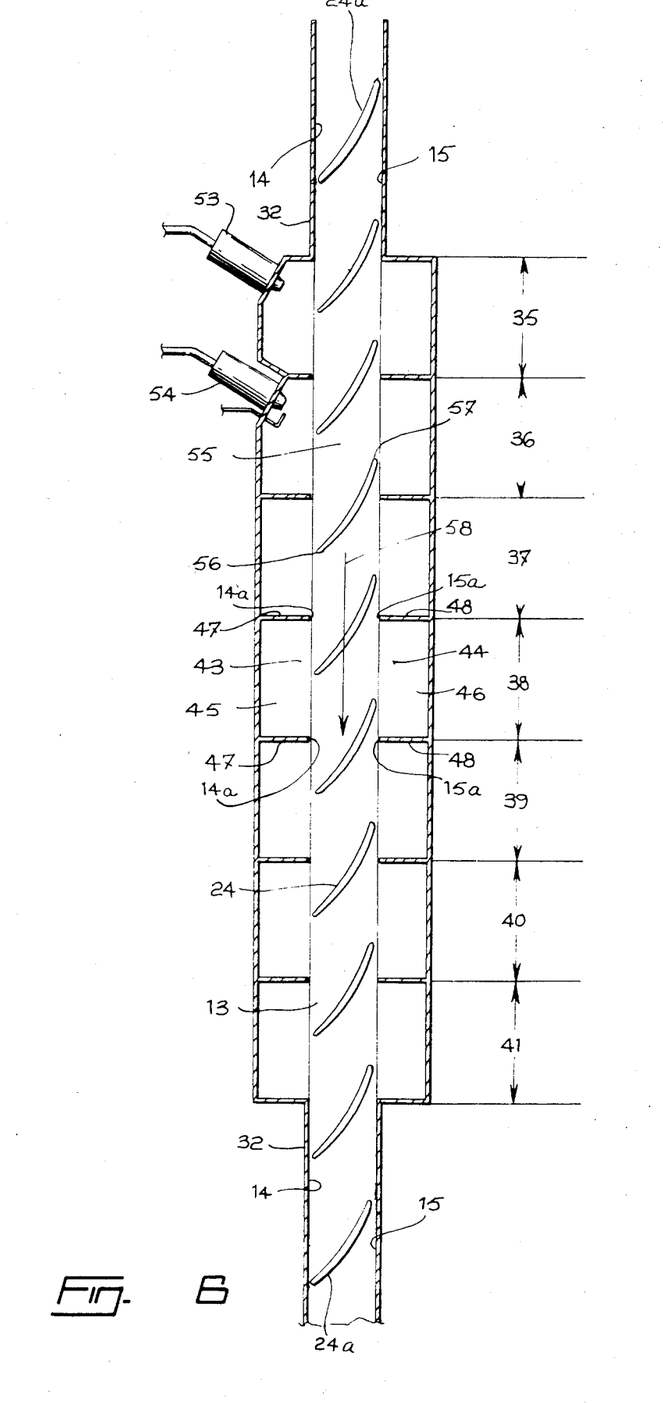
FIG. 6 is a top view of a cross-section along C—C of the reaction chamber illustrated in FIG. 5.

FIGS. 5 and 6 show a single reaction chamber of the turbine motors as illustrated in FIGS. 1 and 2. The reaction chamber comprise two end tunnel segments 32 spaced apart by a plurality of abutting zones indicated by the reference numbers 35 to 41. These zones are made up of respective length portions of the first wall member 12 and the periphery of the rotor ring 13 (i.e. the second ring wall member); similarly for the end tunnel segments.

Referring to FIG. 6, each of the zones 35 to 41 is provided with respective first 43 and second 44 gas apertures, see for example zone 38. Each of the zones 35 to 41 is also provided with first 45 and second 46 opposing gas pockets, again see for example zone 38. The pockets illustrated have a generally U-shaped cross-sectional configuration; other configurations may possibly be used e.g. funnel configurations. The gas apertures 43 and 44 define the mouth of respective gas pockets 45 and 46. The first gas pockets 45 are separated from each other by wall members 47, the tips 14a of which define the limits of the first opposing wall 14. Similarly the second gas pockets 46 are separated from each other by wall members 48, the tips 15a of which define the limits of the second opposing wall 15; see zone 38.

As can be seen the gas apertures 43 and 44 occupy a substantial length of each zone (i.e. circumferential length).

Figure 7:
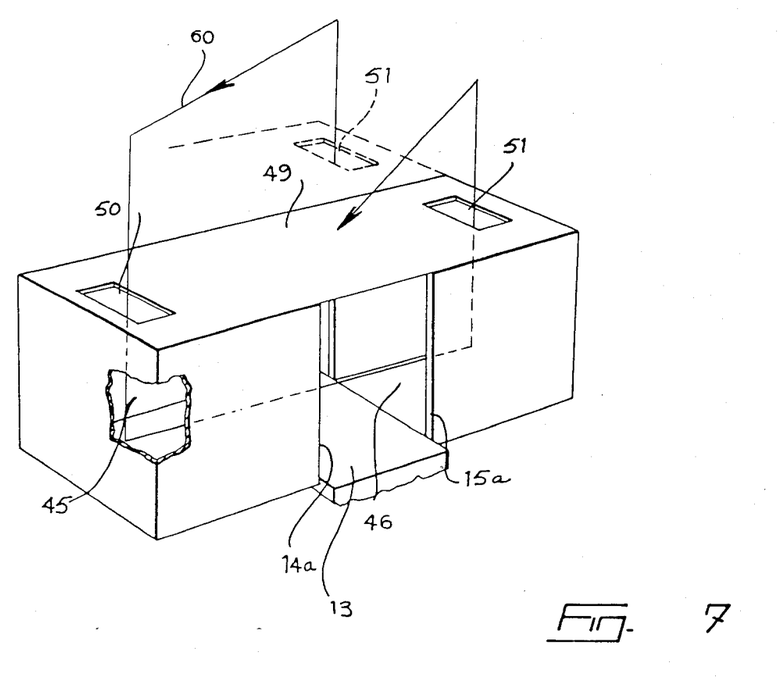
FIG. 7 is a perspective view of a single zone of the reaction chamber illustrated in FIG. 6.

FIG. 7 illustrates an essentially complete zone of the reaction chamber shown in FIGS. 5 and 6. For convenience, FIG. 7 only shows the periphery of the rotor ring 13 and does not show any blades or other connecting elements of the reaction tunnel. The zone includes a cover plate 49 which defines a portion of the mouths of each of the gas pockets and part of the gas pockets themselves. The cover plate 49 also spaces apart the first and second opposing walls 14 and 15 as defined by the tips 14a and 15a. The cover plate 49 also includes holes 50 and 51 which communicate with respective gas pockets 45 and 46.

Refering now to FIG. 5, hole 51 of the exhaust zone 41, is in gas communication with the exhaust conduit 34. Hole 51 of each of the other zones is in gas communication with hole 50 of the following abutting zone by means of an exterior gas heat exchange conduit 52. In FIG. 3, the end walls of the conduits 52 can be seen as the upper squares between the inlets 33 and the outlets 34. The conduits 52 abut one another and the cover plates 49 of the zones; i.e. in FIG. 5 the tops of the gas conduits 52 are shown, the holes 50 and 51 being underneath these conduits. The air inlet conduit 33 communicates with hole 50 of zone 35 which is the first zone of the reaction chamber.

Returning to FIG. 6, the combustion means is defined by the first gas pockets of zones 35 and 36. The first gas pocket of zone 35 is provided with fuel inlet means 53 and the first gas pocket of zone 36 is provided with igniter means 54 (e.g. a spark plug). Alternatively, as indicated above, the combustion means may be defined by a separate combustion chamber, the combustion outlet being in gas communication with the first gas pocket of zone 35; the air inlet conduit 33 in this case communicates with the combustion chamber.

The end tunnel segments 32 of the reaction chamber in FIG. 6 are defined by respective segments of the reaction ring tunnel. The segments are of the same length and are sufficiently long so that at least one reaction blade 24a is always completely disposed therein. Since the blades 24a and the first tunnel wall member 12 are separated by a relatively small clearance, the blades in the end tunnel segments inhibit the transfer of combustion gas between reaction chambers, facilitating the evacuation of combustion gas via the exhaust conduits.

The reaction blades 24 shown in FIG. 6 are identical (i.e. in shape) and are disposed parallel to each other, the gap 55 between any two blades being the same (i.e. the blades are equidistant from each other). The blades have an arcuate cross-section but are straight in the radial direction with respect to the power shaft. The leading edge 56 of the blades is adjacent to the first opposing wall 14 while the following edge 57 is adjacent to the second opposing wall 15. The rotation of the rotor ring 13 is in the direction of the arrow 58.

Returning to FIGS. 1, 2 and 3, the first wall member 12 and the exterior gas conduits 52 are disposed within the compressed air housing 26, i.e. within the air cavity thereof. They also define a portion of the wall of the compressed air housing along with cover plate 21. Compressed air 59 in the compressed air housing can not only come into heat exchange engagement with the exterior gas conduits but also the combustion means prior to entering the combustion means.

During steady state operation of the turbine motors illustrated in FIGS. 1 and 2 compressed air 59 compressed by the rotation of the air compression means, is caused to flow through the compressed air housing 26 where it comes into heat exchange contact at least with the exterior gas conduits 52. The so preheated air is then directed to the combustion means via inlet 33 where it mixes with fuel in such ratio that a continuous combustion process can take place. The pressure of the air compressed by the rotation of the air compression means is higher than the pressure of the combustion gas produced by the combustion means. The pressure of the combustion gas produced by the combustion means in turn is higher than the pressure of the combustion gas entering the exhaust conduit. Therefore hot combustion gas impinges on the reaction blades causing the blades to rotate. The combustion gas can circulate through the zones and the interconnecting exterior gas conduits like a gas cork screw or endless gear which engages the reaction blades; combustion gas entering a zone from a gas conduit can impinge upon rotor blades to facilitate the rotation of the rotor ring. As indicated above, the combustion gas can follow a corkscrew-like circulation path through a reaction chamber; FIG. 7 shows a portion of the corkscrew circulation path 60.

The embodiments of the invention in which an exclusive property or privilege is claimed are defined as follows:

1. A gas turbine motor comprising:

at least one reaction ring tunnel having a first ring tunnel wall member and a second ring tunnel wall member, said first ring tunnel wall member being provided with first and second spaced apart opposing walls, said second ring tunnel wall member being defined by the periphery of a rotor ring; said rotor ring being in sealing and rotational engagement with said first ring tunnel wall member, a power shaft axially disposed with respect to said reaction ring tunnel, fixing means fixing said rotor ring to said power shaft, two spaced apart cover plates sealingly fixed to said first ring tunnel wall member, the fixing means fixing said rotor ring to said power shaft being disposed between said cover plates, said power shaft being in sealing and rotational engagement with said cover plates, said cover plates and said first ring tunnel wall member defining a shroud for said rotor ring and the means fixing said rotor ring to said power shaft, radial reaction blades fixed to said rotor ring and disposed in said reaction ring tunnel between said first and second opposing walls, said reaction blades being spaced apart from each other by a gap and being distributed around the periphery of said rotor ring, each of said reaction blades being spaced apart from said first ring tunnel wall member to provide a small clearance therebetween, each of said reaction blades having a leading edge and a following edge, said leading edge being adjacent to said first opposing wall, said following edge being adjacent to said second opposing wall, at least one reaction chamber comprising two end tunnel segments spaced apart by a plurality of abutting zones, each end tunnel segment comprising respective length portions of said first and second ring tunnel wall members and having a length whereby at least one reaction blade is always completely disposed therein, each zone comprising respective length portions of said first and second ring tunnel wall members, the portion of the first opposing wall of each zone being provided with a first gas aperture, the portion of the second opposing wall of each zone being provided with a second gas aperture, said zones commencing with a first zone and terminating with an exhaust zone, the second gas aperture of said exhaust zone being in gas communication with an exhaust conduit, the second gas aperture of each of the other zones being in gas communication with the first gas aperture of the following abutting zone by means of a respective exterior gas heat exchange conduit, combustion means, in which fuel can be combusted, having a fuel inlet, a compressed air inlet and igniter means, the first gas aperture of the first zone of said reaction chamber being in gas communication with said combustion means, said combustion means, said reaction chamber and said reaction blades being adapted to cooperate so that combustion gas is supplied to said reaction chamber and reacts upon the reaction blades to impart thrust to said rotor ring, a compressed air housing fixed to said first ring tunnel wall member and having an air inlet, said first ring tunnel wall member and said exterior gas conduits being disposed within said compressed air housing and defining a portion of the wall of said housing, and air compression means comprising at least one set of radially extending air compression blades fixed to a portion of said power shaft extending outside of said shroud, said air compression means being disposed adjacent to said shroud and being adapted to cooperate with a portion of said compressed air housing to compress air entering the air inlet of said housing, said housing being configured to bring compressed air into contact with said exterior gas conduits and then to direct said compressed air to the air inlet of said combustion means, said exterior gas conduits being adapted to allow indirect heat exchange between combustion gas and compressed air.

2. A gas turbine motor as defined in claim 1, characterized in that said combustion means is disposed within said compressed air housing.

3. A gas turbine motor as defined in claim 2, characterized in that said combustion means comprises a combustion chamber having a combustion gas outlet in gas communication with the first gas aperture of said first zone of said reaction chamber and having said fuel inlet, said air inlet and said igniter means.

4. A gas turbine motor as defined in claim 3, characterized in that said blades are identical and are disposed in parallel arrangement and in that the gaps between all of said blades are identical.

5. A gas turbine motor as defined in claim 4, characterized in that the apertures of each zone are dimensioned so that they are equal to or smaller than said gaps.

6. A gas turbine motor as defined in claim 5, characterized in that said turbine comprises one reaction ring tunnel and two or more identical reaction chambers disposed about said tunnel.

7. A gas turbine motor as defined in claim 1, characterized in that each zone is provided with first and second opposing gas pockets, the first gas aperture of each zone defining the mouth of the first gas pocket, the second gas aperture of each zone defining the mouth of the second gas pocket, the second gas pocket of the exhaust zone being in gas communication with said exhaust conduit, the second gas pocket of each of the other zones being in gas communication with the first gas pocket of the following abutting zone by means of a said respective exterior gas conduit, the first gas pocket of said first zone being in gas communication with said combustion means.

8. A gas turbine motor as defined in claim 7, characterized in that said reaction chamber includes a second zone disposed prior to said exhaust zone and following and abutting said first zone and in that said combustion means is defined by the first gas pockets of said first and second zones, the first gas pocket of said first zone being provided with said fuel inlet and said air inlet, the first gas pocket of said second zone being provided with said igniter means.

9. A gas turbine motor as defined in claim 8, characterized in that said blades are identical and are disposed in parallel arrangement and in that the gaps between all of the said blades are identical.

10. A gas turbine motor as defined in claim 9, characterized in that the apertures of each zone are dimensioned so that they are equal to or smaller than said gaps.

11. A gas turbine motor as defined in claim 10, characterized in that said turbine comprises one reaction ring tunnel and two or more identical reaction chambers disposed about said tunnel.

12. A gas turbine motor as defined in claim 11, characterized in that a portion of said shroud adjacent to said air compression means defines a portion of the wall of said compressed air housing.

13. A gas turbine motor comprising:
at least one reaction ring tunnel having a first ring tunnel wall member and a second ring tunnel wall member, said first ring tunnel wall member being provided with first and second spaced apart opposing walls, said second ring tunnel wall member being defined by the periphery of a rotor ring, said rotor ring being in sealing and rotational engagement with said first ring tunnel wall member,
a power shaft axially disposed with respect to said reaction ring tunnel,
fixing means fixing said rotor ring to said power shaft,
rotational engagement means fixed to said first ring tunnel wall member and rotationally engaging said power shaft,
radial reaction blades fixed to said rotor ring and disposed in said reaction ring tunnel between said first and second opposing walls, said reaction blades being spaced apart from each other by a gap and being distributed around the periphery of said rotor ring, each of said reaction blades being spaced apart from said first ring tunnel wall member to provide a small clearance therebetween, each of said reaction blades having a leading edge and a following edge, said leading edge being adjacent to said first opposing wall, said following edge being adjacent to said second opposing wall,
at least one reaction chamber comprising two end tunnel segments spaced apart by a plurality of abutting zones, each end tunnel segments comprising respective length portions of said first and second ring tunnel wall members and having a length whereby at least one reaction blade is always completely disposed therein, each zone comprising respective length portions of said first and second ring tunnel wall members, the portion of the first opposing wall of each zone being provided with a first gas aperture, the portion of the second opposing wall of each zone being provided with a second gas aperture, said zones commencing with a first zone and terminating with an exhaust zone, the second gas aperture of said exhaust zone being in gas communication with an exhaust conduit, the second gas aperture of each of the other zones being in gas communication with the first gas aperture of the following abutting zone by means of a respective exterior gas heat exchange conduit,
combustion means, in which fuel can be combusted, having a fuel inlet, a compressed air inlet and igniter means, the first gas aperture of the first zone of said reaction chamber being in gas communication with said combustion means,
said combustion means, said reaction chamber and said reaction blades being adapted to cooperate so that combustion gas is supplied to said reaction chamber and reacts upon the reaction blades to impart thrust to said rotor ring,
a compressed air housing fixed to said first ring tunnel wall member and having an air inlet
and air compression means comprising at least one set of radially extending air compression blades fixed to a shaft adapted to rotate as said power shaft rotates, said air compression means being adapted to cooperate with a portion of said compressed air housing to compress air entering the air inlet of said housing, said housing being configured to bring compressed air into contact with said exterior gas conduits and then to direct said compressed air to the air inlet of said combustion means, said exterior gas conduits being adapted to allow indirect heat exchange between combustion gas and compressed air.

14. A gas turbine motor as defined in claim 13, characterized in that said first ring tunnel wall member and said exterior gas conduits are disposed within said compressed air housing and define a portion of the wall of said housing.

15. A gas turbine motor as defined in claim 13, characterized in that said combustion means is disposed within said compressed air housing.

16. A gas turbine motor as defined in claim 13, characterized in that said combustion means comprises a combustion chamber having a combustion gas outlet in gas communication with the first gas aperture of said first zone of said reaction chamber and having said fuel inlet, said air inlet and said igniter means.

17. A gas turbine motor as defined in claim 13, characterized in that said blades are identical and are disposed in parallel arrangement and in that the gaps between all of said blades are identical.

18. A gas turbine motor as defined in claim 17, characterized in that the apertures of each zone are dimensioned so that they are equal to or smaller than said gaps.

19. A gas turbine motor as defined in claim 13, characterized in that said turbine comprises one reaction ring tunnel and two or more identical reaction chambers disposed about said tunnel.

20. A gas turbine motor as defined in claim 13, characterized in that each zone is provided with first and second opposing gas pockets, the first gas aperture of each zone defining the mouth of the first gas pocket, the second gas aperture of each zone defining the mouth of the second gas pocket, the second gas pocket of the exhaust zone being in gas communication with said exhaust conduit, the second gas pocket of each of the other zones being in gas communication with the first gas pocket of the following abutting zone by means of a said respective exterior gas conduit, the first gas pocket of said first zone being in gas communication with said combustion means.

21. A gas turbine motor as defined in claim 20, characterized in that said reaction chamber includes a second zone disposed prior to said exhaust zone and following and abutting said first zone and in that said combustion means is defined by the first gas pockets of said first and second zones, the first gas pocket of said first zone being provided with said fuel inlet and said air inlet, the first gas pocket of said second zone being provided with said igniter means.

22. A gas turbine as defined in claim 6, characterized in that said turbine comprises four identical reaction chambers disposed about said tunnel.

23. A thrust system, suitable for a gas turbine motor, comprising:

a reaction ring tunnel having a first ring tunnel wall member and a second ring tunnel wall member, said first ring tunnel wall member being provided with first and second spaced apart opposing walls, said second ring tunnel wall member being defined by the periphery of a rotor ring, said rotor ring being in sealing and rotational engagement with said first ring tunnel wall member, radial reaction blades fixed to said rotor ring and disposed in said reaction ring tunnel between said first and second opposing walls, said reaction blades being spaced apart from each other by a gap and being distributed around the periphery of said rotor ring, each of said reaction blades being spaced apart from said ring tunnel wall member to provide a small clearance therebetween, each of said reaction blades having a leading edge and a following edge, said leading edge being adjacent to said first opposing wall, said following edge being adjacent to said second opposing wall, at least one reaction chamber comprising two end tunnel segments spaced apart by a plurality of abutting zones, each end tunnel segment comprising respective length portions of said first and second ring tunnel wall members and having a length whereby at least one reaction blade is always completely disposed therein, each zone comprising respective length portions of said first and second ring tunnel wall members, the portion of the first opposing wall of each zone being provided with a first gas aperture, the portion of the second opposing wall of each zone being provided with a second gas aperture, said zones commencing with a first zone and terminating with an exhaust zone, the second gas aperture of said exhaust zone being in gas communication with an exhaust conduit, the second gas aperture of each of the other zones being in gas communication with the first gas aperture of the following abutting zone by means of a respective exterior gas heat exchange conduit, combustion means, in which fuel can be combusted, having a fuel inlet, a compressed air inlet and igniter means, the first gas aperture of the first zone of said reaction chamber being in gas communication with said combustion means, said combustion means, said reaction chamber and said reaction blades being adapted to cooperate so that combustion gas is supplied to said reaction chamber and reacts upon the reaction blades to impart thrust to said rotor ring, said exterior gas conduits being adapted to allow indirect heat exchange between combustion gas and compressed air before the air is delivered to the compressed air inlet.

24. A thrust system as defined in claim 23, characterized in that said combustion means comprises a combustion chamber having a combustion gas outlet in gas communication with the first gas aperture of said first zone of said reaction chamber and having said fuel inlet, said air inlet and said igniter means.

25. A thrust system as defined in claim 23, characterized in that said blades are identical and are disposed in parallel arrangement and in that the gaps between all of said blades are identical.

26. A thrust system as defined in claim 25, characterized in that the apertures of each zone are dimensioned so that they are equal to or smaller than said gaps.

27. A thrust system as defined in claim 23, characterized in that each zone is provided with first and second opposing gas pockets, the first gas aperture of each zone defining the mouth of the first gas pocket, the second gas aperture of each zone defining the mouth of the second gas pocket, the second gas pocket of the exhaust zone being in gas communication with said exhaust conduit, the second gas pocket of each of the other zones being in gas communication with the first gas pocket of the following abutting zone by means of a said respective exterior gas conduit, the first gas pocket of said first zone being in gas communication with said combustion means.

28. A thrust system as defined in claim 27, characterized in that said reaction chamber includes a second zone disposed prior to said exhaust zone and following and abutting said first zone and in that said combustion means is defined by the first gas pockets of said first and second zones, the first gas pocket of said first zone being provided with said fuel inlet and said air inlet, the first gas pocket of said second zone being provided with said igniter means.

29. A gas turbine as defined in claim 12, characterized in that said turbine comprises four identical reaction chambers disposed about said tunnel.

30. A gas turbine as defined in claim 19, characterized in that said turbine comprises four identical reaction chambers disposed about said tunnel.

* * * * *